(12) United States Patent
Kleine et al.

(10) Patent No.: US 6,533,047 B2
(45) Date of Patent: Mar. 18, 2003

(54) SUCTION TOOL

(75) Inventors: Werner Kleine, Achim (DE); Hans-Werner Bongers-Ambrosius, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/750,667

(22) Filed: Dec. 29, 2000

(65) Prior Publication Data

US 2001/0006123 A1 Jul. 5, 2001

(30) Foreign Application Priority Data

Jan. 3, 2000 (DE) .......................... 100 00 015

(51) Int. Cl.⁷ .............................. B28D 1/26
(52) U.S. Cl. .................. 175/213; 173/198; 408/67
(58) Field of Search .............. 408/67, 58; 175/213; 173/78, 198

(56) References Cited

U.S. PATENT DOCUMENTS

| | | | | | |
|---|---|---|---|---|---|
| 2,919,901 A | * | 1/1960 | Sandvig | ...................... | 173/138 |
| 3,003,493 A | * | 10/1961 | Miller | ......................... | 175/207 |
| 3,162,255 A | * | 12/1964 | McCarty | ..................... | 175/213 |
| 3,589,352 A | * | 6/1971 | Carlsson et al. | ............... | 125/6 |
| 4,135,847 A | * | 1/1979 | Hemmings | .................... | 407/32 |
| 4,372,401 A | * | 2/1983 | Fischer | ....................... | 175/209 |
| 4,911,253 A | * | 3/1990 | Cliche | ......................... | 125/20 |
| 5,234,294 A | * | 8/1993 | Hoppe et al. | ............... | 175/209 |
| 6,086,292 A | * | 7/2000 | Yokoyama | ................... | 279/143 |

* cited by examiner

Primary Examiner—David Bagnell
Assistant Examiner—John Kreck
(74) Attorney, Agent, or Firm—Sidley Austin Brown & Wood, LLP

(57) ABSTRACT

A tool for drilling and/or chiseling for use with a hand-held mechanized tool having a suction device (10) including a housing (11) surrounding the tool (1), with the tool (1) including a tubular shaft (2) and a connection member (3) located opposite a front end of the shaft (2) for connecting the shaft (2) with the housing (11) of the suction device (10) and having a diameter larger than a diameter of the shaft (2), and with the connection member (3) being formed of a core (5) surrounding the shaft (2), and an adapter (6) surrounding the connection member core (5) and having a cross-bore (7) opening into the through-channel (8) formed in the shaft (2).

7 Claims, 2 Drawing Sheets

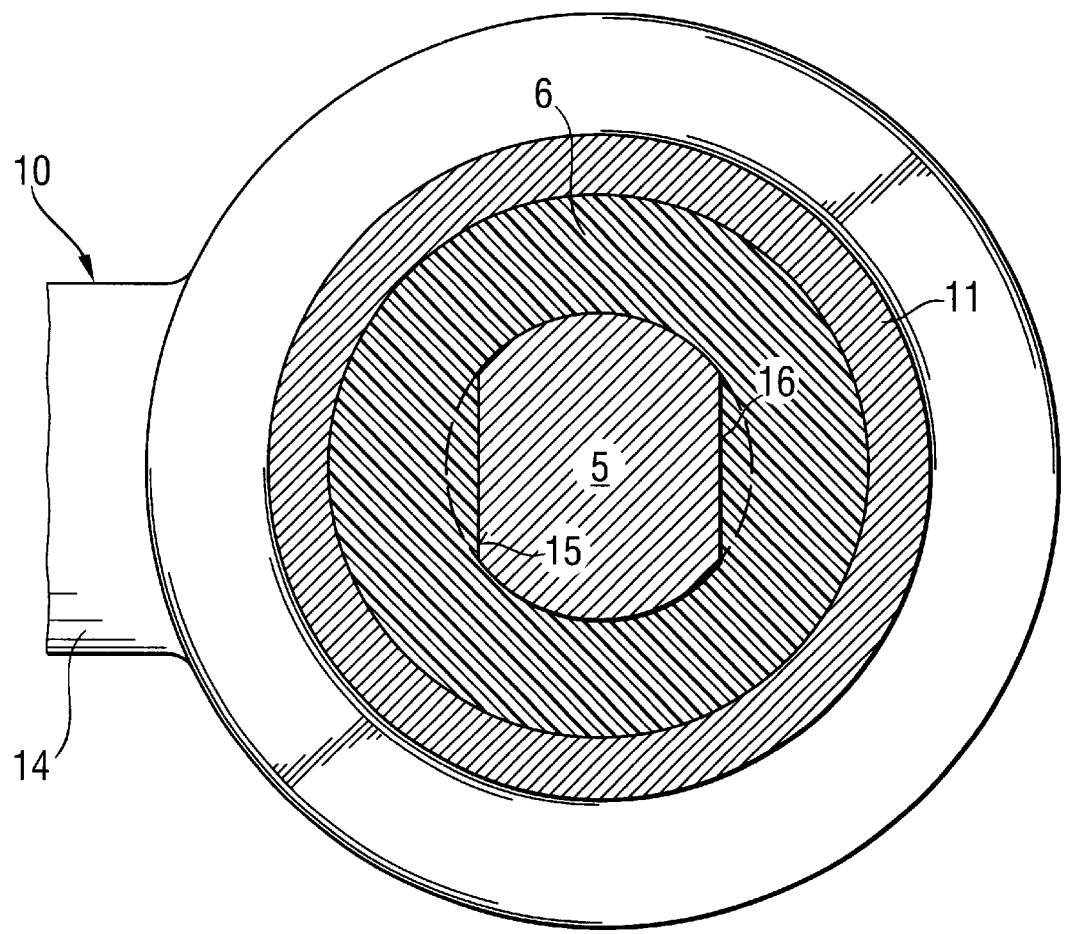

SUCTION TOOL

BACKGROUND OF THE INVENTION

1. Field of the Invention

The present invention relates to a tool for drilling and/or chiseling and used with a hand-held mechanized tool having a suction device including a housing surrounding the tool, with the tool including a tubular shaft having an axially extending through-channel, and a connection member located opposite a front end of the shaft for connecting the shaft with the housing of the suction device and having a diameter larger than a diameter of the shaft and a cross-bore opening into the through-channel of the shaft.

2. Description of the Prior Art

A tool of the type described above is used for drilling and/or chiseling in stone, concrete, brickwork and similar brittle materials. Tools of this type are known in which the drillings are removed from a drilled or chiseled bore via at least one helical groove provided on the tool shaft. Also known are tools with a suction capability, so-called suction drills. The suction drill has an axial bore connectable with a suction device connectable with a vacuum producing apparatus, in particular, a so-called vacuum cleaner. In comparison with a drill provided with a helical removing groove, the suction drill has a higher drilling capacity and insures a better cleaning of a drilled bore.

A tool formed as a suction drill is disclosed in German Publication DE 198 10 192A1. The known tool is insertable in a hand-held mechanized tool having a suction device including a housing surrounding the tool. The tool has a tubular shaft having an axially extending through-channel. A connection member is located opposite a front end of the shaft and connects the shaft with the housing of the suction device. The connection member has a diameter larger than a diameter of the shaft and has a cross-bore opening into the through-channel of the shaft.

In the tool disclosed in DE 198 10 192A1, the connection member is welded or soldered to the tool shaft. It is also known to form the connection member and the shaft as a one-piece part, as disclosed, e.g., in German Publication De 196 03 528A1. The connection member used in known tool makes the tool not cost-effective, in particular, when the connection member and the shaft are formed as a one-piece member. This is because due to the increased diameter of the tool, an increased amount of machining is needed to form the tool. The maximal diameter of the connection member determines, during the tool manufacture, the diameter of the blank. During the formation of the tool, the regions of the shaft or the shank must be reduced to the desired diameter by machining.

Further, because of the increased mass, which is caused by the connection member, the known tool has a smaller impact energy transmission between the mechanized tool and the, e.g., drill, independent on whether the connection member is formed with the shaft as a one-piece member or as a separate member connectable with the shaft.

Accordingly, an object of the present invention is to provide a tool for drilling and/or chiseling which can be economically produced.

Another object of the invention is to provide a drilling and/or chiseling tool which would permit to optimize the transmission of the impact energy between the mechanized tool and the drilling and/or chiseling tool.

SUMMARY OF THE INVENTION

These and other objects of the present invention, which will become apparent hereinafter, are achieved by forming the connection member of a core and at least one adapter surrounding the core.

Forming the connection member of a core and a core surrounding adapter permits to advantageously adapt tools having different shaft diameters to the suction device. Thus, the housing of the suction device can be adapted to a tool having the largest diameter and, in the region of the connection member, the difference in diameters of the tool shafts can be compensated by using adapters having a diameter corresponding to the shaft diameter. This also permits to optimize the tool construction in view of different considerations, e.g., to achieve an optimal energy transmission and/or to reduce manufacturing or operational costs. In addition, with the inventive connection member, a labor-consuming machining is eliminated, and material losses are significantly reduced.

Preferably, the adapter is formed of a material having a lower density than the material the shaft and/or the core are formed of. This permits to achieve an optimal impact energy transmission as the mass in the region of the connection member is reduced. The reduction in mass results from forming the adapter of a material having a lower density than the core material. The undesired mass accumulation in the region of the connection member can be reduced by forming the adapter of a thin-wall material, e.g., sheet steel.

A further reduction of the mass accumulation can be achieved by forming the adapter of a plastic material, e.g., polyamide that has a lower density than steel. The plastic material also favorably influences manufacturing, facilitating the formation and mounting, which reduces manufacturing costs. In addition, the plastic material provides a better elasticity of the adapter and insures good sealing characteristics of the adapter.

When the reduction in costs is paramount, the adapter can fixedly be connected with the core.

With the fixed connection of the adapter with the core, an optimal manufacturing process is connecting the adapter, which is made of a plastic material, with the core by injection molding.

In order to provide for a simple adaptation of tools having different diameters to a particular suction device, the adapter advantageously is releasably connected with the core. In this way, the dimensions of different tools are varied by using different adapters.

The releasable connection of an adapter with a core can be effected by providing on the adapter and the core mating shoulders.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show:

FIG. 2 shows a cross-sectional view along line II—II in FIG. 1 at an increased scale.

DETAILED DESCRIPTION OF THE PREFERRED EMBODIMENT

Figure 1:
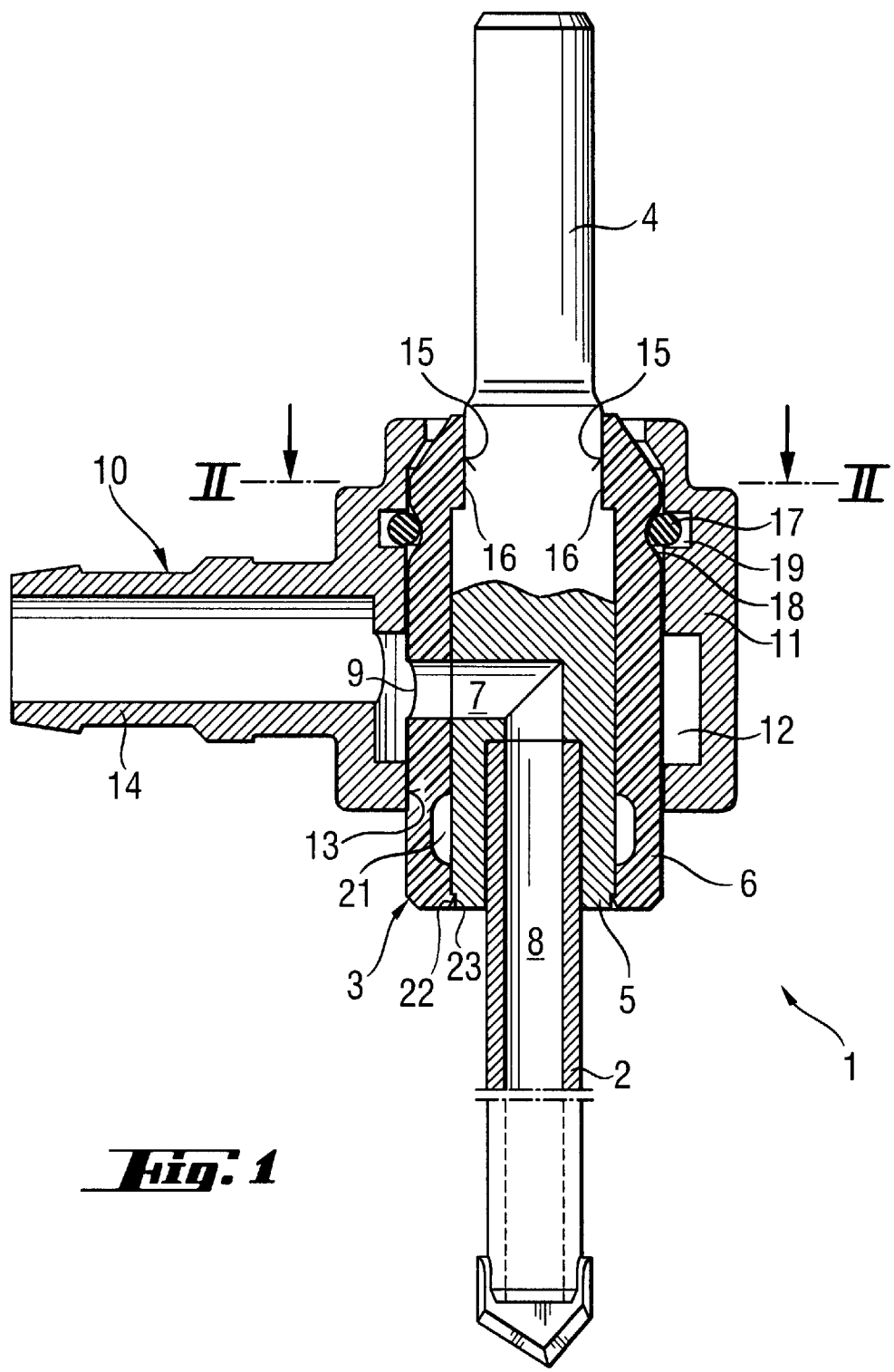
FIG. 1 shows a partially cross-sectional view of a tool according to the present invention with a suction device.

A tool according to the present invention, which is shown in FIG. 1 and is designated generally with a reference numeral 1, has a tubular shaft 2, a connection member 3, and a shank 4. In the region of the connection member 3, the tool 1 is encircled by suction device 10.

The tubular shaft 2 has an axially extending through-channel 8 and is connected at its end with the connection member 3. The shank 4 serves for insertion of the tool in a hand-held tool (not shown). The connection member 3 has a core 5 which is formed, for convenience reasons, of the same material as the shank 4, and an adapter 6 formed of a plastic material. The connection member 3 has a cross-bore 7 that opens into the through-channel 8 of the shaft 2, and an opening 9 formed in the section of the circumferential surface of the adapter 6.

The suction device 10 includes a housing 11 which surrounds the connection member 3 along the major portion of the axial extent of the connection member 3. The housing 11 forms, together with the circumferential surface of the adapter 6 surrounded by the housing 11, a suction chamber 12 into which the opening 9 of the cross-bore 7 of the connection member 3 opens. The circumferential surface of the adapter 6 and the associated contact surfaces 13 of the housing 11 of the suction device are sealed. A suction union 14, which is arranged on the housing 11, opens into the suction chamber 12.

At the end zone of the adapter 6 adjacent to the shank 4, there are provided a pair of opposite flattenings 15 which can also be seen in FIG. 2. In order to prevent rotation of the adapter 6 relative to the core 5, the flattenings 15 are provided with complementary segment recesses 16, likewise shown in FIG. 2. The segment recesses 16 serve as stop shoulder for the adapter 8. An O-ring 17, which is located in a recess 18, at least partially surrounds the outer circumference of the adapter 6 in a region adjacent to the segment recesses 16. The recess 18 extends over the entire circumference of the adapter 6 and is so formed that a portion of the O-ring 17 extends radially beyond the circumference of the adapter 6. A groove 19 is formed in the housing 11 for receiving the protruding portion of the O-ring 17. The housing 11 of the suction device 10 and the adapter 6 form a releasable connection.

In order to prevent, in a mounted condition, the sliding of the adapter 6 from the core 5 toward the shank 4, a snap mechanism is provided at the end section of the adapter 6 facing in the operational direction of the tool 1. The snap mechanism is formed of a recess 21 formed in the inner surface of the adapter 6, and an inwardly radially extending web 22 provided at the end surface of the adapter 6. The recess 21 extends, preferably along the entire circumference of the adapter 6. In the mounted condition, the web 22 engages in a complementary groove 23 provided in the core 5.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A tool for use with a hand-held mechanized tool having a suction device (10) including a housing (11) surrounding the tool (1), the tool (1) comprising a tubular shaft (2) having an axially extending through-channel (8); and a connection member (3) located opposite a front end of the shaft (2) for connecting the shaft (2) with the housing (11) of the suction device (10) and having a diameter larger than a diameter of the shaft (2), the connection member (3) having a cross-bore (7) opening into the through-channel (8) of the shaft (2), a core (5) surrounding the shaft (2), and an adapter (6) for supporting the tool in the suction device housing (11) and surrounding the core (5), and connected with the core (5) for joint rotation therewith, the adapter having means (15) for preventing rotation of the adapter (6) relative to the core (5), and an opening (9) for connecting the cross-bore (7) with a suction chamber (12) of the suction device (10).

2. A tool according to claim 1, wherein the adapter (6) is formed of a material having a smaller density than a material the core (5) and the shaft (2) are formed of.

3. A tool according to claim 1, wherein the adapter (6) is formed of a plastic material.

4. A tool according to claim 1, wherein the adapter is fixedly connected with the core (5).

5. A tool according to claim 4, wherein the adapter (6) is mounted on the core (5) by injection-molding.

6. A tool according to claim 1, wherein the adapter is releasably connected with the core (5).

7. A tool according to claim 1, wherein the core (5) has a shoulder, and the adapter has a mating shoulder cooperating with the core shoulder for connecting the adapter (6) with the core (5).

\* \* \* \* \*